United States Patent
Rozman et al.

(10) Patent No.: US 10,651,770 B2
(45) Date of Patent: May 12, 2020

(54) DIRECT CURRENT VOLTAGE REGULATION OF A SIX-PHASE PERMANENT MAGNET GENERATOR

(71) Applicant: Hamilton Sundstrand Corporation, Charlotte, NC (US)

(72) Inventors: Gregory I. Rozman, Myrtle Beach, SC (US); Steven J. Moss, Rockford, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 16/116,041

(22) Filed: Aug. 29, 2018

(65) Prior Publication Data

US 2020/0076340 A1    Mar. 5, 2020

(51) Int. Cl.
*H02P 9/30* (2006.01)
*H02M 3/158* (2006.01)
*B64D 41/00* (2006.01)
*H02M 7/06* (2006.01)
*H02M 1/44* (2007.01)

(52) U.S. Cl.
CPC .............. *H02P 9/305* (2013.01); *B64D 41/00* (2013.01); *H02M 3/158* (2013.01); *H02M 7/06* (2013.01); *H02M 1/44* (2013.01)

(58) Field of Classification Search
CPC ......... H02P 9/305; B64D 41/00; H02M 3/158
USPC ........................................................ 322/28
See application file for complete search history.

(56) References Cited

U.S. PATENT DOCUMENTS

| | | | |
|---|---|---|---|
| 5,394,321 A | 2/1995 | McCleer et al. | |
| 5,642,009 A | 6/1997 | McCleer et al. | |
| 6,097,127 A | 8/2000 | Rivera | |
| 6,340,851 B1 | 1/2002 | Rinaldi et al. | |
| 7,227,273 B2 | 6/2007 | Ahmad et al. | |
| 7,274,547 B2 | 9/2007 | Al-Khayat et al. | |
| 7,301,310 B2 | 11/2007 | Ganev et al. | |
| 7,330,012 B2 | 2/2008 | Ahmad | |
| 7,385,372 B2 | 6/2008 | Ahmad et al. | |
| 7,408,327 B2 | 8/2008 | Shah et al. | |
| 7,439,713 B2 * | 10/2008 | Dooley | H02P 9/34 322/22 |
| 7,479,757 B2 | 1/2009 | Ahmad | |
| 7,710,081 B2 | 5/2010 | Saban et al. | |
| 7,960,948 B2 | 6/2011 | Saban et al. | |

(Continued)

FOREIGN PATENT DOCUMENTS

EP    3343747 A1    7/2018

*Primary Examiner* — Sean Gugger
(74) *Attorney, Agent, or Firm* — Cantor Colburn LLP

(57) ABSTRACT

An aircraft power generation unit to generate direct current (DC) power provided to a load includes a six-phase permanent magnet generator (PMG) and a rectifier section that converts alternating current (AC) voltage produced by the six-phase PMG into a DC output. The rectifier section includes a first six-pulse rectifier and a second six-pulse rectifier connected to the second set of windings. The unit also includes an output bus configured to be connected to the load and including a positive rail and a negative rail connected to the second rectifier and an output voltage regulation section that provides an output voltage to the output bus. The unit also include a controller that provides a pulse width modulated (PWM) signal to the output voltage regulation section to vary the output voltage provided to the output bus.

15 Claims, 2 Drawing Sheets

(56) References Cited

U.S. PATENT DOCUMENTS

| | | |
|---|---|---|
| 8,148,867 B2 | 4/2012 | Gieras et al. |
| 8,432,137 B2 | 4/2013 | Rozman et al. |
| 8,816,650 B2 | 8/2014 | Rozman et al. |
| 8,836,293 B1 | 9/2014 | Rozman et al. |
| 8,885,372 B1* | 11/2014 | Nanut .................. H02M 1/12 307/11 |
| 8,975,876 B2 | 3/2015 | Rozman et al. |
| 9,059,647 B2 | 6/2015 | Rozman et al. |
| 9,667,232 B2 | 5/2017 | Kuznetsov |
| 9,853,512 B2 | 12/2017 | Trainer et al. |
| 9,941,827 B2 | 4/2018 | Rozman et al. |
| 9,985,562 B1 | 5/2018 | Rozman et al. |
| 10,075,106 B2 | 9/2018 | Rozman et al. |
| 10,396,680 B1 | 8/2019 | Rozman et al. |
| 2005/0276020 A1 | 12/2005 | Ahmad |
| 2006/0001318 A1 | 1/2006 | Ahmad et al. |
| 2006/0001319 A1 | 1/2006 | Ahmad et al. |
| 2006/0001397 A1 | 1/2006 | Ahmad et al. |
| 2007/0182382 A1* | 8/2007 | Aoyama ................ H02P 9/305 322/28 |
| 2008/0103632 A1 | 5/2008 | Saban et al. |
| 2009/0009146 A1 | 1/2009 | Rozman et al. |
| 2010/0244599 A1 | 9/2010 | Saban et al. |
| 2012/0120689 A1* | 5/2012 | Rozman .................. H02H 3/05 363/53 |
| 2012/0126758 A1* | 5/2012 | Fang ...................... H02P 9/48 322/29 |
| 2013/0325366 A1 | 12/2013 | Rozman |
| 2014/0266077 A1 | 9/2014 | Rozman et al. |
| 2014/0266079 A1 | 9/2014 | Rozman et al. |
| 2015/0061606 A1 | 3/2015 | Pan et al. |
| 2015/0263526 A1 | 9/2015 | Kjaer |
| 2016/0001333 A1 | 1/2016 | Jones et al. |
| 2017/0359009 A1 | 12/2017 | Rozman et al. |
| 2018/0131254 A1 | 5/2018 | Rozman et al. |
| 2018/0198395 A1 | 7/2018 | Gieras |
| 2018/0287483 A1* | 10/2018 | Henrard ................ H02M 7/068 |
| 2019/0081582 A1* | 3/2019 | Rozman ................ H02M 5/4585 |
| 2019/0097546 A1 | 3/2019 | Rozman et al. |
| 2019/0097558 A1* | 3/2019 | Rozman .................. H02P 9/14 |

* cited by examiner

DIRECT CURRENT VOLTAGE REGULATION OF A SIX-PHASE PERMANENT MAGNET GENERATOR

BACKGROUND

Exemplary embodiments pertain to the art of power generation and, in particular, regulating a direct current (DC) voltage generated by a six-phase permanent magnet generator.

A conventional DC power generating system utilizes a 3-phase variable-speed permanent magnet generator (PMG) and an active rectifier. PMG's offers high efficiency and high power density in comparison with a wound-field synchronous generator. However, the size of the conventional two-level six switch active rectifier requires large size passive components, such as dc link capacitor and output power quality filter. Torque pulsation is sensitive to phase current harmonics. Torque ripple producing currents of 3-phase PMG is given by $6n\pm1$ ($n=1, 2, 3 \ldots$).

A 6-phase PMG eliminates sixth harmonic torque pulsation caused by harmonic components in the stator current. To achieve high power density, multilevel topologies, such as an unidirectional Vienna Rectifier or a bi-directional neutral diode clamped multilevel converter, have been considered to achieve low harmonic distortion with moderate switching frequency and reduced EMI emissions compared to a standard 2-level active rectifier/inverter. However, these topologies are complex and expensive.

BRIEF DESCRIPTION

Disclosed is an aircraft power generation unit to generate direct current (DC) power provided to a load. The unit includes a six-phase permanent magnet generator (PMG) that includes first and second sets of windings, each of the first and second sets including three windings and a rectifier section that converts alternating current (AC) voltage produced by the six-phase PMG into a DC output. The rectifier section includes: a first six-pulse rectifier connected to the first set of windings and having a first rectifier positive output and a first rectifier return output; and a second six-pulse rectifier connected to the second set of windings and having a second rectifier positive output and a second rectifier return output, wherein the first rectifier return output is connected to the second rectifier positive output and wherein the second rectifier positive output is connected to the rectifier section positive output. The unit also includes an output bus configured to be connected to the load and including a positive rail and a negative rail connected to the second rectifier return output and an output voltage regulation section that provides an output voltage to the output bus and that is coupled between the first rectifier positive output and the second rectifier positive output. The output voltage regulation section selectively coupling the first rectifier positive output or the second rectifier positive output to the positive rail of the output bus. The unit also includes a controller that provides a pulse width modulated (PWM) signal to the output voltage regulation section to vary the output voltage provided to the output bus to provide a constant voltage to the load.

According to any prior disclosed embodiment of a unit, the output voltage regulation section includes a single pole double throw switch that includes a control output that is connected to the output bus.

According to any prior disclosed embodiment of a unit, the output bus includes an output filtering section.

According to any prior disclosed embodiment of a unit, the controller receives a feedback voltage measured across the output bus and compares it to a reference voltage.

According to any prior disclosed embodiment of a unit, a duty cycle of the PWM signal is proportional to a difference between the feedback voltage and the reference voltage.

According to any prior disclosed embodiment of a unit, the first six pulse rectifier is a passive rectifier.

According to any prior disclosed embodiment of a unit, the second six pulse rectifier is a passive rectifier.

According to any prior disclosed embodiment of a unit, the windings of the first set of windings are shifted 60 degrees from the second set of windings.

According to any prior disclosed embodiment of a unit, the windings of the first set of windings are shifted 30 degrees from the second set of windings.

According to any prior disclosed embodiment of a unit, output voltage regulation section includes two serially connected switches having a node between them connected to the positive rail of the output bus.

In one embodiment, a method of providing direct current (DC) power provided to a load is disclosed. The method includes: generating alternating current (AC) power with a six-phase permanent magnet generator (PMG) that includes first and second sets of windings, each of the first and second sets including three windings; converting the AC power produced by the six-phase PMG into a DC output, with a rectifier section that includes: a first six-pulse rectifier connected to the first set of windings and having a first rectifier positive output and a first rectifier return output; and a second six-pulse rectifier connected to the second set of windings and having a second rectifier positive output and a second rectifier return output, wherein the first rectifier return output is connected to the second rectifier positive output and wherein the second rectifier positive output is connected to the rectifier section positive output; selectively coupling the first rectifier positive output or the second rectifier positive output to a positive rail of the output bus based on a pulse width modulated (PWM) signal provided by a controller to provide a constant voltage to the load.

According to any prior disclosed method, the first rectifier positive output or the second rectifier positive output are selectively coupled to the positive rail of the output bus by is a single pole double throw switch coupled between the first rectifier positive output or the second rectifier positive output and having a control output connected to the positive rail of the output bus.

According to any prior disclosed method, the controller receives a feedback voltage measured across the output bus and compares it to a reference voltage.

According to any prior disclosed method, a duty cycle of the PWM signal is proportional to a difference between the feedback voltage and the reference voltage.

According to any prior disclosed method, the first six pulse rectifier and second six pulse rectifier are passive rectifiers.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Disclosed herein is a power generating system that integrates a 6-phase PMG and a power converter into an affordable high power density alternator with a good power quality, reduced losses, and low torque pulsation. In contrast to prior systems that employ active rectifiers, the disclosed system in one embodiment utilizes passive rectifiers and, as such, does not require a generator position sensor for rectifier control.

One problem that can occur in PMG systems is that the output voltage is dependent of generator speed and load. By employing the teachings herein wherein two passive rectifiers are stacked so that the output voltages of them can be added together, the output voltage can be changed between a low voltage level and a higher, upper level voltage by selectively adding the voltage produced by one rectifier to the other. This can be done by controlling one or more switches with a pulse width modulated signal. This can improve power density and, as will be understood by the skilled artisan, improves power quality by reducing output voltage ripple without an increase of output power quality filter size due to lower dc link current harmonic content.

Figure 1:
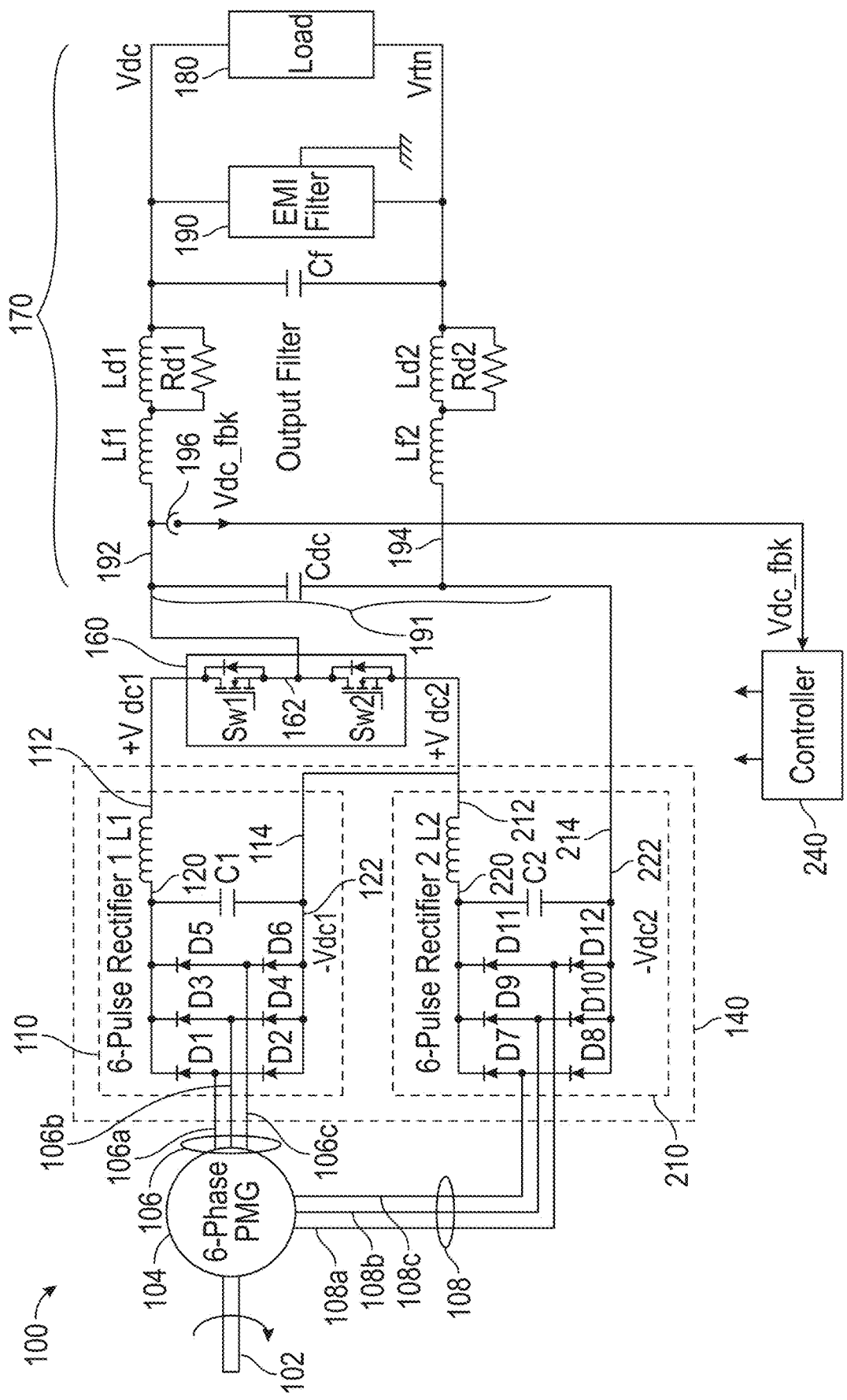
FIG. 1 is a schematic of a system that generates and delivers a regulated voltage to a load.

FIG. 1 is schematic of power generation system 100 according to one embodiment. The system can be part of aircraft or other vehicle and can receive rotational energy from a prime mover 102 such as a shaft connected to aircraft turbine, a RAM air turbine or an internal combustion engine.

The system 100 includes a 6-phase permanent magnet generator (PMG) 104. The PMG 104 includes first and second sets of windings. As illustrated, the first set of windings includes outputs 106a, 106b and 106c and the second set of windings includes outputs 108a, 108b and 108c. The outputs of the first set of windings are collectively referred to as first winding outputs 106 and the outputs of the second set of windings are collectively referred to as second winding outputs 108.

The PMG 104 can have either a symmetric or asymmetric winding configuration. In a symmetric configuration there can be a 60° phase shift between two sets of windings with magneto motive force (MMF) harmonic components of 6n±1 (n=1, 3, 5 . . . ). The lowest order harmonic torque ripple is produced by the $5_{th}$ and $7_{th}$ current harmonics. In an asymmetric configuration there is 30° phase shift between two sets of windings with MMF harmonic components of 12n±1 (n=0, 1, 2 . . . ) at equal loading of the winding sets that occur at low speed. The lowest order harmonic torque ripple is produced by the $11_{th}$ and $13_{th}$ current harmonics. At low speed the voltage ripple on DC bus before the output filter is reduced due to near equal loading and 180° phase shift between the voltage ripples at the output of the first and second rectifiers 110, 210 described further below. As PMG speed increases, the loading of second rectifier increases resulting in increase of voltage ripple on the output bus 191 before the output filter 170 due to reduction of compensating effect. However, increase of voltage ripple frequency improves voltage ripple attenuation at the load 180, due to performance of the output filter. The effects of full or partial compensation of voltage ripple at low speeds and increasing frequency of voltage ripple at high speeds helps to minimize requirements to the output filter and improve system power density.

Each set of windings is connected to a different one of two six-pulse rectifiers 110, 210. As illustrated, the outputs 106 of the first set of windings are connected to a first rectifier 110. The first rectifier 110 is a passive rectifier in one embodiment and includes 6 diodes D1-D6. The first rectifier 110 converts the three phase AC voltage received from the PMG 104 via outputs 106 to a DC voltage that is provided between a positive output 112 and a return output 114. In operation, the voltage generated by the first rectifier is generally referred to at +Vdc1.

The first rectifier 110 includes a positive rail 120 and negative rail 122. D1 and D2 are serially connected between the positive and negative rails 120, 122 with output 106a connected between them. Similarly, D3 and D4 are serially connected between the positive and negative rails 120, 122 with output 106b connected between them and D5 and D6 are serially connected between the positive and negative rails 120, 122 with output 106c connected between them.

As shown, the first rectifier 110 also includes an optional LC output filter comprising C1 and L1. This optional filter can improve the output quality of the DC current and voltage produced by the first rectifier 110. L1 is connected along the positive rail 120 between D5 and the positive output 112 and C1 is connected in between the positive rail 120 and the negative rail 122.

As illustrated, the outputs 108 of the second set of windings are connected to a second rectifier 210. The second rectifier 210 is a passive rectifier in one embodiment and includes 6 diodes D7-D12. The second rectifier 210 converts the three phase AC voltage received from the PMG 104 via outputs 108 to a DC voltage that is provided between a positive output 212 and a return output 214. In operation, the voltage generated by the second rectifier 210 is generally referred to at +Vdc2. In operation, the voltage at the positive output 212 is generally referred to at +Vdc2 and at the return output 214 as −Vdc2.

The second rectifier 210 includes a positive rail 220 and negative rail 222. D7 and D8 are serially connected between the positive and negative rails 220, 222 with output 108a connected between them. Similarly, D9 and D10 are serially connected between the positive and negative rails 220, 222 with output 108b connected between them and D11 and D12 are serially connected between the positive and negative rails 220, 222 with output 108c connected between them.

As shown, the second rectifier 210 also includes an optional LC output filter comprising C2 and L2. Similar to the above, this optional filter can improve the output quality of the DC current and voltage produced by the second rectifier 210. L2 is connected along the positive rail 220 between D11 and the positive output 212 and C2 is connected in between the positive rail 220 and the negative rail 222.

In FIG. 1, the positive output 212 of the second rectifier 210 is connected to the return output 114 of the first rectifier 110. The first and second rectifiers 110, 210 can collectively be referred to as a rectifier section 140.

An output voltage regulation section 160 is coupled between the positive output 112 of the first rectifier 110 and the positive output 212 of the second rectifier.

In one embodiment, the output voltage regulation section 160 can be implemented as a single throw double pole solid state switch that includes individual switches Sw1 and Sw2 with a central terminal represented by node 162. Of course, the switches Sw1 and Sw2 could be two independent switches serially connected with a node between them.

Regardless of the configuration of the output voltage regulation section 160, the voltage at node 162 can be controlled as described below.

In particular, when Sw2 is closed and Sw1 is open the output voltage at node 162 is equal voltage +Vdc2. When Sw1 is closed and Sw 2 is open the output voltage is equal voltage +Vdc1 developed at the output of the first rectifier 110 plus voltage Vdc2. By controlling duty cycle of the switches, the output voltage at node 162 can be controlled in the Vdc2<Voutput<(Vdc1+Vdc2) range.

The output of the voltage regulation section 160 (e.g. the voltage between node 162 and the return output 214 of the second rectifier 210) is provided to a DC output bus 191 that includes a positive rail 192 and a negative or return rail 194. The output bus 191 provides power to a load 180.

To smooth voltage output at node 162 (e.g., across output bus 191) an output capacitor Cdc can be provided across the output of the output voltage regulation section 160. This voltage can be directly provided to a load 180 in one embodiment. Optionally, an output filter 170 can be provided between the output of the output voltage regulation section 160 and the load 180.

The output filter 170 includes inductances $L_{F1}$ and $L_{D1}$ arranged serially along a positive rail 192 of the DC output bus 191, and inductances $L_{F2}$ and $L_{D2}$ arranged serially along the return rail 194 of the DC output bus 191. Resistances $R_{D1}$ and $R_{D2}$ may further be arranged on the DC output bus, in parallel communication with inductances $L_{D1}$ and $L_{D2}$, respectively. Furthermore, a filter capacitor $C_F$ may be arranged across the DC output bus 191. Also, an EMI filter 190 can also be arranged across the DC output bus 191.

The system can also include a controller 240. The controller 240, in generally, provides a PWM signal to the output voltage regulation section 160 to control the voltage provides to the output bus. In one embodiment, the signals operate to selectively connect one of the first rectifier positive output or the second rectifier positive output to the output bus 191. Of course, other connections can be made and will be understood by the skilled artisan. For example, in the case where the switches Sw1, Sw2 can be independently controlled, Sw1 can be open and a duty cycle gating signal applied to switch Sw2 to provide a voltage between 0 and +Vdc2 to the output bus 191.

To that end, the system 100 can include a voltage or other electrical sensor 196 that measures a voltage on the positive rail 192 with respect to the negative rail 194. The sensor provides the measurement to the controller 240. The controller 240 provides gate pulses or other signals to the switches Sw1 and Sw2 to vary the voltage produced node 162 (e.g., provided to the rails 192/194 of the output bus. For instance, consider the two cases described above where voltage is varied between Vdc2 and (Vdc1+Vdc2). To select a voltage in between these, the controller could switch between the two configurations (Sw1 open and Sw2 closed and vice-versa) for equal amounts of time (e.g, a 50% duty cycle).

Figure 2:
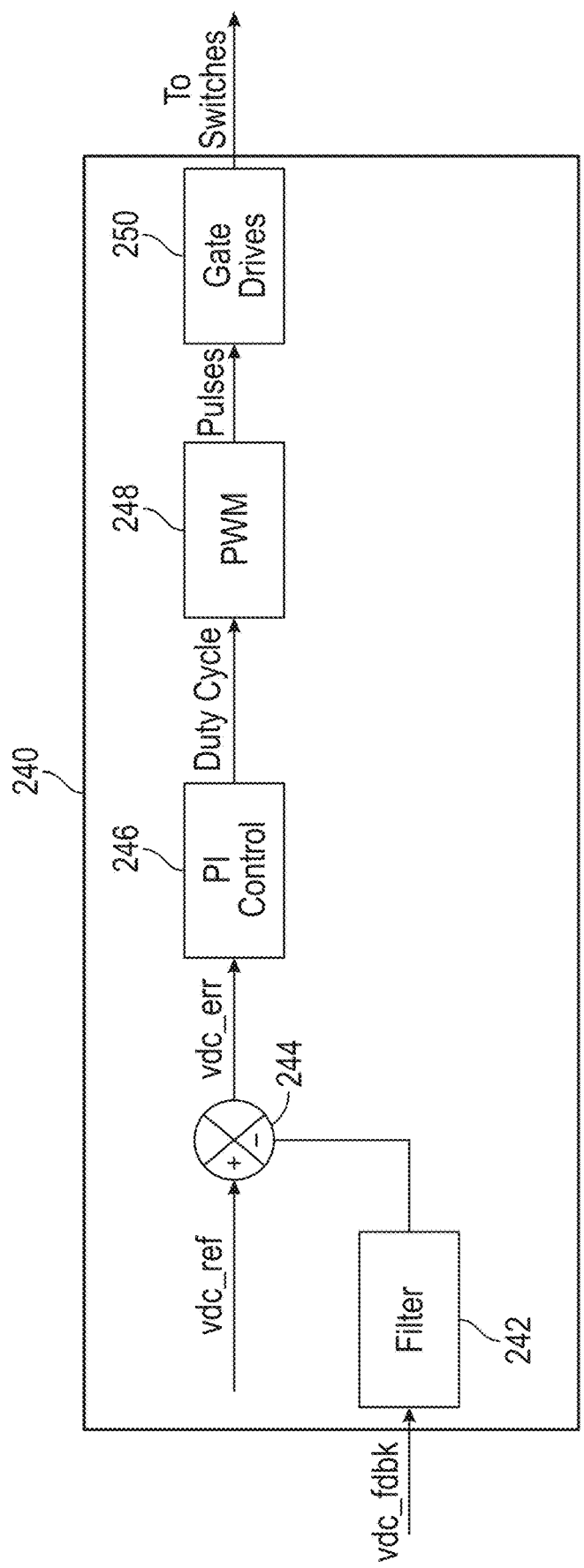
FIG. 2 is an example controller that can be utilized in the system of FIG. 1.

FIG. 2 shows an example controller 240. The controller 240 receives as an input Vdc_fdbk that is measured on the positive rail 192 with respect to the negative rail 194 (FIG. 1). The value can optionally be filtered by in input filter 242 and then compared to reference voltage (vdc_ref) that represents a desired voltage. provided to the load, even if the load is variable. Such a comparison results in an error signal vdc_err that is the output of comparator 244. The error signal may be provided to PI controller 246 to determine a duty cycle for driving switches. The duty cycle can be used by a PWM controller 248 to generate gate pulses which are then driven by a gate driver 250 to control the switches Sw1, Sw2.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An aircraft power generation unit to generate direct current (DC) power provided to a load, the unit comprising:
    a six-phase permanent magnet generator (PMG) that includes first and second sets of windings, each of the first and second sets including three windings;
    a rectifier section that converts alternating current (AC) voltage produced by the six-phase PMG into a DC output, the rectifier section comprising:
        a first six-pulse rectifier connected to the first set of windings and having a first rectifier positive output and a first rectifier return output; and
        a second six-pulse rectifier connected to the second set of windings and having a second rectifier positive output and a second rectifier return output, wherein the first rectifier return output is connected to the second rectifier positive output;
    an output bus configured to be connected to the load and including a positive rail and a negative rail connected to the second rectifier return output;
    an output voltage regulation section that provides an output voltage to the output bus and that is coupled between the first rectifier positive output and the second rectifier positive output, the output voltage regulation section selectively coupling the first rectifier positive output or the second rectifier positive output to the positive rail of the output bus; and
    a controller that provides a pulse width modulated (PWM) signal to the output voltage regulation section to vary the output voltage provided to the output bus to provide a constant voltage to the load.

2. The unit of claim 1, wherein output voltage regulation section includes a single pole double throw switch that includes a control output that is connected to the output bus.

3. The unit of claim 1, wherein the output bus includes an output filtering section.

4. The unit of claim 1, wherein the controller receives a feedback voltage measured across the output bus and compares it to a reference voltage.

5. The unit of claim 4, wherein a duty cycle of the PWM signal is proportional to a difference between the feedback voltage and the reference voltage.

6. The unit of claim 1, wherein the first six pulse rectifier is a passive rectifier.

7. The unit of claim 6, wherein the second six pulse rectifier is a passive rectifier.

8. The unit of claim 1, wherein the windings of the first set of windings are shifted 60 degrees from the second set of windings.

9. The unit of claim 1, wherein the windings of the first set of windings are shifted 30 degrees from the second set of windings.

10. The unit of claim 1, wherein the output voltage regulation section includes two serially connected switches having a node between them connected to the positive rail of the output bus.

11. A method of providing direct current (DC) power provided to a load, the method comprising:
   generating alternating current (AC) power with a six-phase permanent magnet generator (PMG) that includes first and second sets of windings, each of the first and second sets including three windings;
   converting the AC power produced by the six-phase PMG into a DC output, with a rectifier section that includes:
      a first six-pulse rectifier connected to the first set of windings and having a first rectifier positive output and a first rectifier return output; and
      a second six-pulse rectifier connected to the second set of windings and having a second rectifier positive output and a second rectifier return output, wherein the first rectifier return output is connected to the second rectifier positive output; and
   selectively coupling the first rectifier positive output or the second rectifier positive output to a positive rail of the output bus based on a pulse width modulated (PWM) signal provided by a controller to provide a constant voltage to the load.

12. The method of claim 11, wherein the first rectifier positive output or the second rectifier positive output are selectively coupled to the positive rail of the output bus by is a single pole double throw switch coupled between the first rectifier positive output or the second rectifier positive output and having a control output connected to the positive rail of the output bus.

13. The method of claim 11, wherein the controller receives a feedback voltage measured across the output bus and compares it to a reference voltage.

14. The method of claim 12, wherein a duty cycle of the PWM signal is proportional to a difference between the feedback voltage and the reference voltage.

15. The unit of claim 11, wherein the first six pulse rectifier and second six pulse rectifier are passive rectifiers.

* * * * *